United States Patent [19]
Iwane

[11] Patent Number: 6,142,476
[45] Date of Patent: Nov. 7, 2000

[54] MECHANICAL SEAL

[76] Inventor: Tomoichiro Iwane, 52, Okazakitennocho, Sakyo-ku, Kyoto-shi, Kyoto 606, Japan

[21] Appl. No.: 08/945,307
[22] PCT Filed: Feb. 21, 1997
[86] PCT No.: PCT/JP97/00499
§ 371 Date: Jan. 15, 1998
§ 102(e) Date: Jan. 15, 1998
[87] PCT Pub. No.: WO97/31206
PCT Pub. Date: Aug. 28, 1997

[30] Foreign Application Priority Data

Feb. 23, 1996 [JP] Japan .................................. 8-036191

[51] Int. Cl.⁷ ...................................................... F16J 15/34
[52] U.S. Cl. .......................... 277/358; 277/370; 277/390; 277/396; 277/397
[58] Field of Search ..................... 277/358, 370, 277/390, 396, 397

[56] References Cited

U.S. PATENT DOCUMENTS

| | | | |
|---|---|---|---|
| 3,188,095 | 6/1965 | Van Vleet | 277/390 X |
| 3,420,535 | 1/1969 | Hershey | 277/390 |
| 3,589,738 | 6/1971 | Tracy | 277/397 |
| 4,094,512 | 6/1978 | Back | 277/358 X |
| 5,388,843 | 2/1995 | Sedy | 277/397 X |
| 5,711,532 | 1/1998 | Clark et al. | 277/320 |

*Primary Examiner*—Anthony Knight
*Assistant Examiner*—Enoch E. Peavey
*Attorney, Agent, or Firm*—Wenderoth, Lind & Ponack, L.L.P.

[57] ABSTRACT

A mechanical seal having two balance diameters and balance factors established separately and freely for two fluids which are opposed at a sealing face by providing two seal packings with a seal ring. A sidewall of a packing groove is removed on the sealed fluid side when the sealed fluid contains crystal deposits or solid substances, and a vacuum path is connected between the two seal packings. Also, a seal ring can be divided between the two seal packings into two parts so as to provide flexibility against deflection in a radial direction.

9 Claims, 4 Drawing Sheets

(A)

(B)

(C)

MECHANICAL SEAL

BACKGROUND OF THE INVENTION

1. Field of the Invention

This invention relates to a mechanical seal, especially to a mechanical seal which prevents leakage of sealed fluid when a sealed fluid pressure changes and fluctuation of pressure difference take places and further prevents the occurrence of floating failure of a seal ring caused by deposition and adherence of crystals or accumulation of scales at a seal portion.

2. Description of Related Art

In a conventional mechanical seal, there has been provided a groove for mounting a seal packing (o-ring and the like as a secondary seal) and also provided a small gap between a sealing face and the opening end of the groove. Where a sealed fluid (hereinafter referred to as fluid A) contains solid substances or the fluid tends to separate out crystals, solid deposits tend to adhere to the small gap, and as a result the seal ring fails and leakage of the sealed fluid occurs, resulting in a very short life of the mechanical seal.

Accordingly, a mechanical seal is not used for a fluid containing crystals or solid substances which adhere to a seal ring, or otherwise a mechanical seal is used while flushing the sealing portion constantly with clean fluid.

Furthermore, a balance factor can be established freely with respect to a fluid pressure of fluid A located on one side of the sealing face, while a balance factor with respect to a fluid pressure of an opposing fluid (hereinafter referred to as fluid B) shall be designed in a limited range which is determined with regard to the balance factor of fluid A and a diameter of a seal packing. It is therefore an object of the present invention to provide a novel mechanical seal so that a balance factor of a mechanical seal can be easily established depending on the fluctuation of sealing pressure and to enhance the capability of the mechanical seal.

SUMMARY OF INVENTION

In order to achieve the above objects, the mechanical seal according to the present invention is characterized in that a seal ring is equipped with two seal packings so as to establish two balance diameters and a balance factor of the mechanical seal is provided separately and freely for two opposed fluids at a sealing face of a mechanical seal.

This invention also provides a mechanical seal having a means to prevent the adherence of crystals and solid substances in a packing groove and in the vicinity thereof. The means includes removing a wall at a sealed fluid side of a packing groove which secures a seal packing.

The pressure in the space between the two seal packings can be reduced to atmospheric pressure or below by means of a vacuum path provided between the two seal packings.

The seal ring may be divided into two parts between the two seal packing while interposing a packing between the divided two parts so that the seal ring may become deflective in a radial direction.

The balance factor of a mechanical seal is determined depending on a sealing face area and a pressure receiving area. The pressure receiving area is determined on the basis of the outer diameter or the inner diameter of the seal packings, namely the balance diameter. Accordingly, in a mechanical seal provided with a seal packing on both sides of fluid A and fluid B respectively, as in the present invention, a balance diameter and a balance factor can be established separately and freely for each of the two fluids which are opposed at the sealing face.

Furthermore, by removing a wall at the sealed fluid side of the packing groove for securing a seal packing and eliminating the small gap at which crystals or solid substances tend to accumulate, the increase of resistance caused by clogging of crystals or solid substances is eliminated and thus the floating property of the seal ring is not impaired. Accordingly the flexibility of the sealing face is improved and leakage of the sealed fluid is prevented.

The seal ring, divided into two parts between the two seal packings while interposing a watertight packing between the divided two parts, can deflect in a radial direction, so that tight sealing can be obtained at the sealing face.

DETAILED DESCRIPTION OF THE INVENTION

Figure 1:
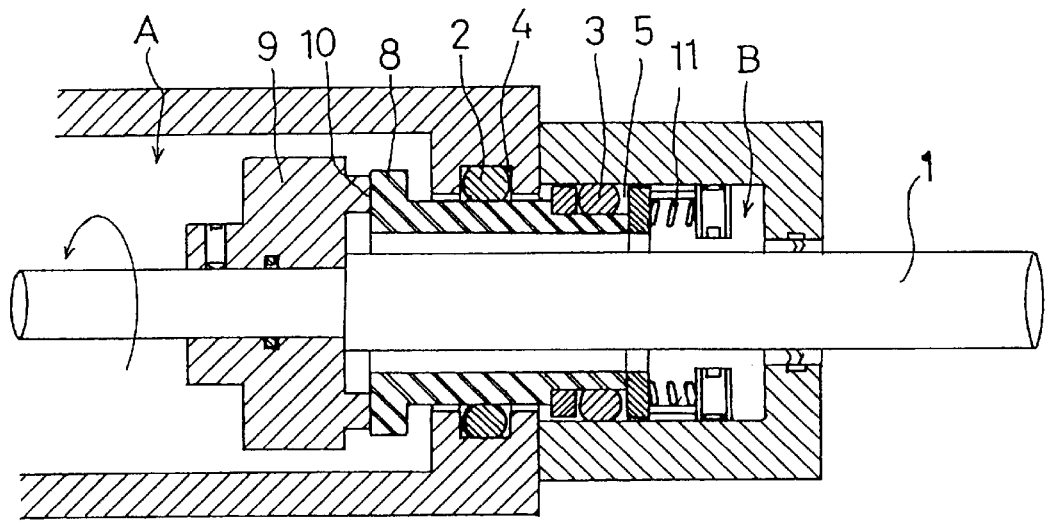
FIG. 1 is a cross-sectional view illustrating a first embodiment constructed in accordance with the present invention.
Figure 2:
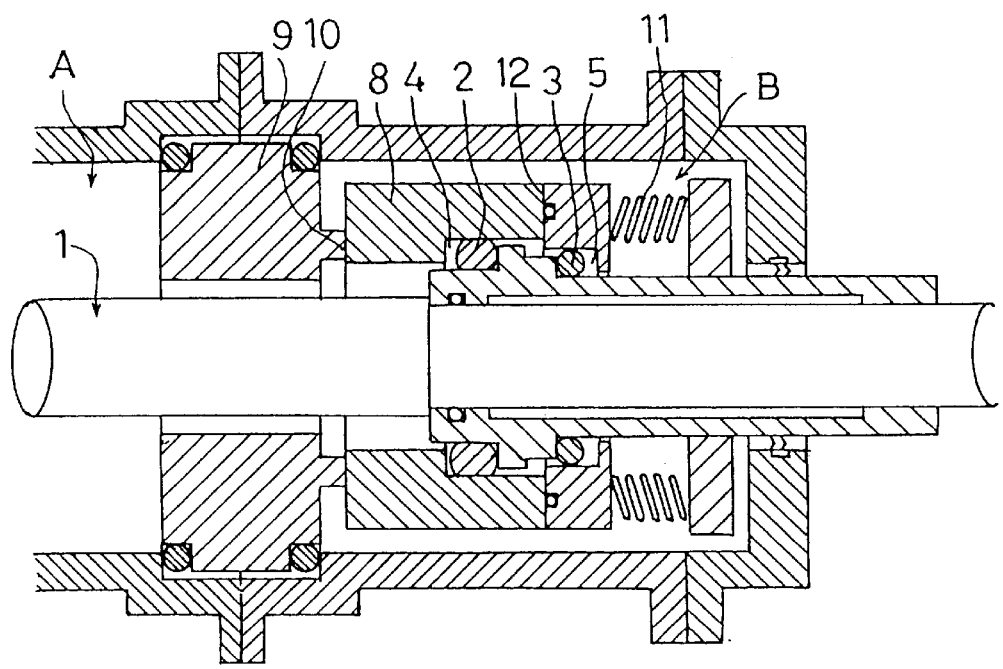
FIG. 2 is a cross-sectional view illustrating a second embodiment constructed in accordance with the present invention.

The invention will now be described with reference to the attached drawings. FIG. 1 shows a first embodiment of a mechanical seal constructed in accordance with the present invention and especially a so-called stationary mechanical seal. FIG. 2 is a second embodiment showing a rotating mechanical seal according to the present invention. In both of the first and second embodiments, a seal ring 8 is equipped with two seal packings 2 and 3 at two packing grooves 4 and 5. With respect to other reference numerals appearing in the drawings, the numeral 1 shows a rotating shaft, numeral 9 shows a mating ring, numeral 10 shows a sealing face and 11 shows a spring.

By adopting such a construction, the stationary mechanical seal shown in FIG. 1 can establish a balance diameter depending on the inner diameter of the seal packing 2. Likewise, the rotating mechanical seal shown in FIG. 2 can establish a balance diameter depending on the outer diameter of the seal packing 2. Furthermore, due to the seal packing 3, a balance diameter can be established freely depending on the pressure of fluid B in both cases of a stationary mechanical seal and a rotating mechanical seal.

Figure 3:
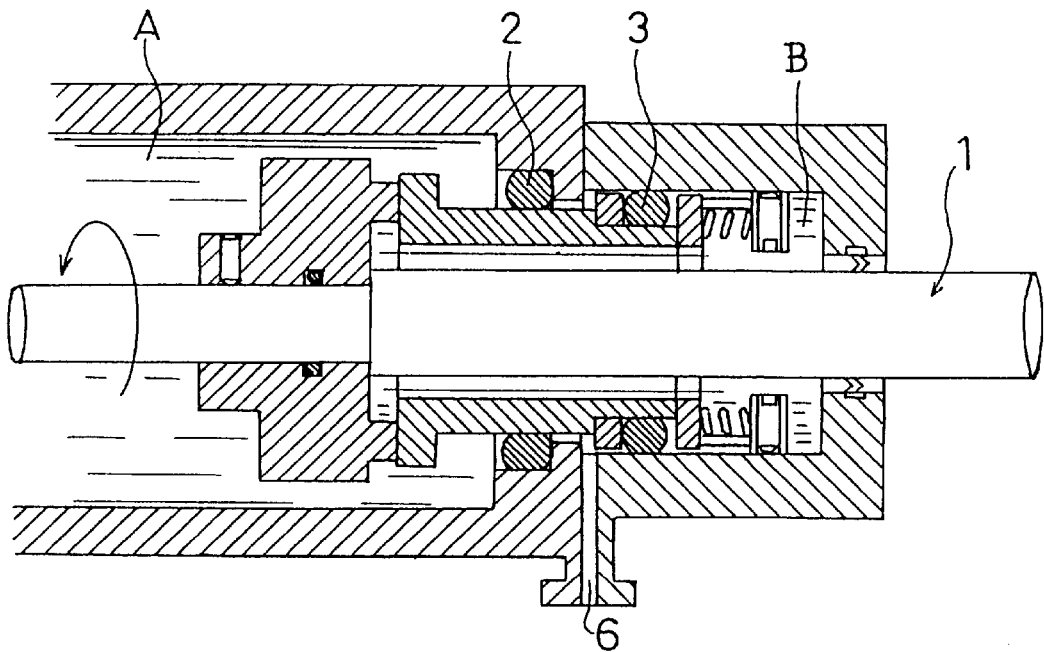
FIG. 3 is a cross-sectional view illustrating a third embodiment constructed in accordance with the present invention.
Figure 4:
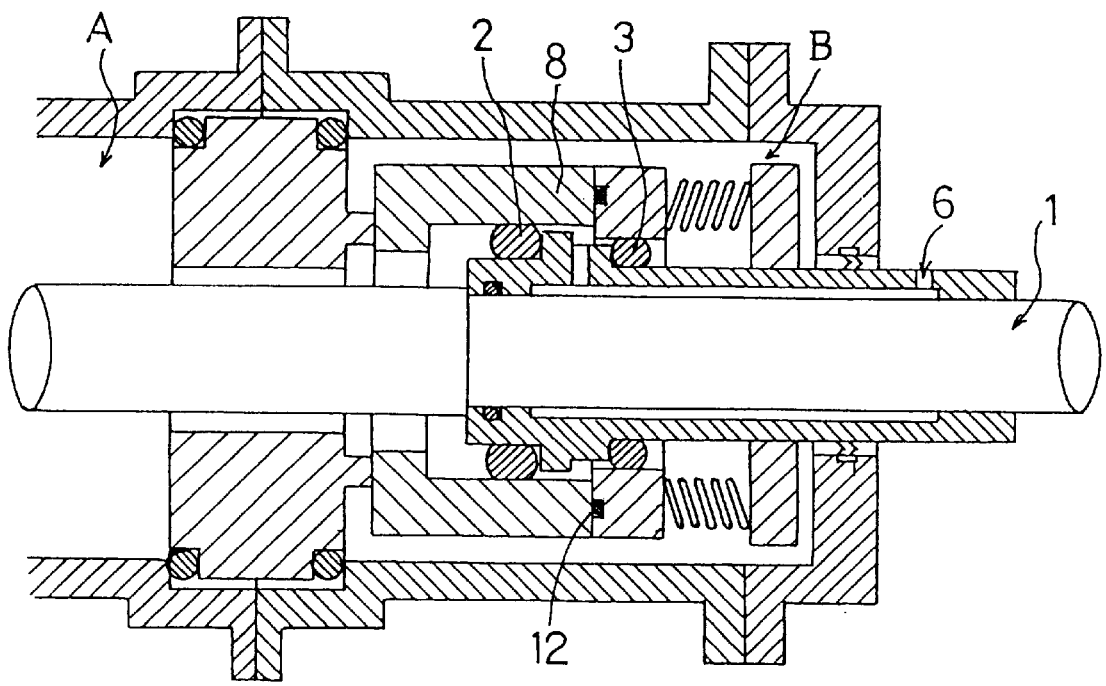
FIG. 4 is a cross-sectional view illustrating a fourth embodiment constructed in accordance with the present invention.
Figure 5:
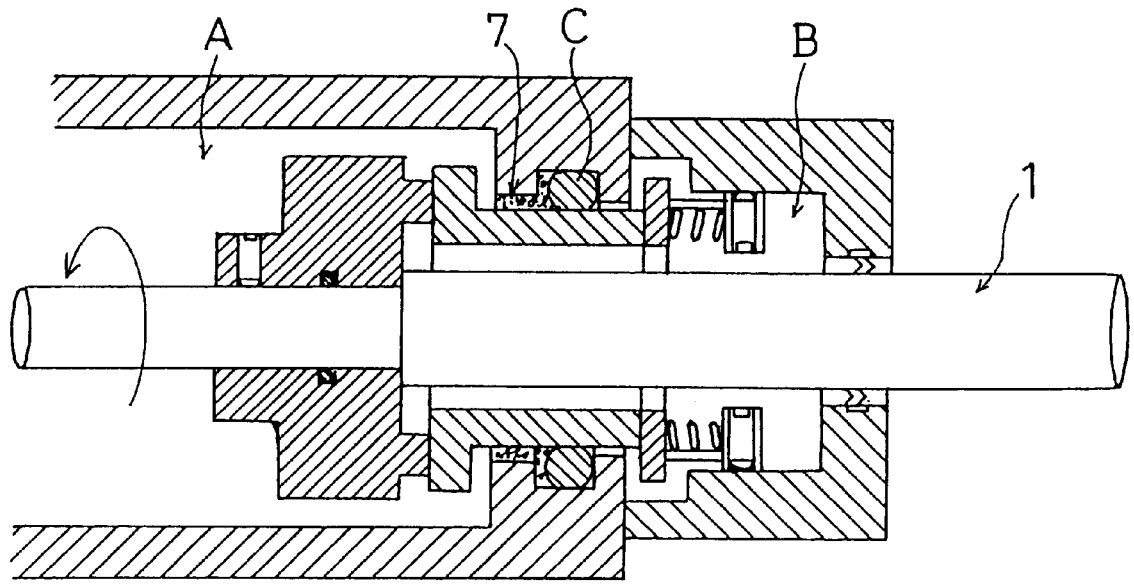
FIG. 5 is a cross-sectional view illustrating a prior art apparatus.

FIGS. 3 and 4 show other embodiments of a mechanical seal, in which a sealed fluid A contains crystals or solid substances which will adhere to the sealing portion. FIG. 3 is a stationary mechanical seal and FIG. 4 is a rotating mechanical seal. In these embodiments, one side of the walls of the packing groove 4 is removed on the fluid A side of seal package 2 leaving a single radially extending flange. A vacuum passage 6 is provided in order to reduce the pressure between the seal packings 2 and 3 to atmospheric pressure or below. Accordingly, since there is no small gap at the opening end of the packing groove 4, the deposits 7, such as crystals and solid substances as shown in FIG. 5, can be prevented. In order to assemble the seal ring safely, it is preferable to remove the wall such that a bit of protrusion remains as shown in FIG. 3.

The seal ring 8 and the mating ring 9 which constitute the sealing face 10 are required to be adjustably mounted to a casing or the shaft 1 in order to absorb the vibration and the eccentricity of the shaft. Accordingly, they are mounted using an O-ring or a V-ring to provide a secondary seal.

Figure 6:
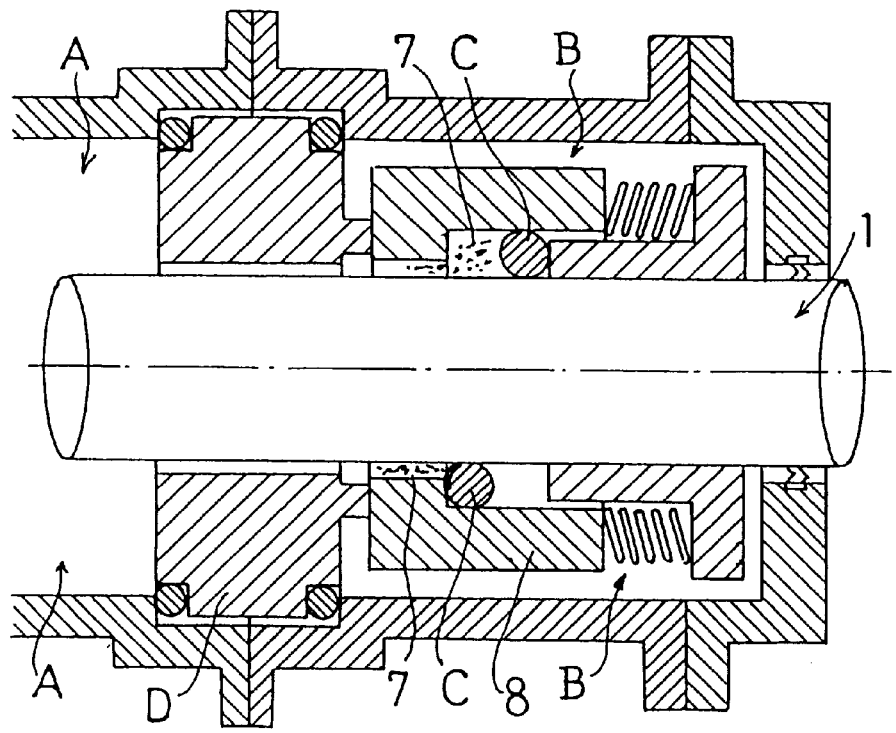
FIG. 6 is a cross-sectional view showing how a fluid A and a fluid B pressurize the seal packings.

The leakage of the fluid A will be explained with reference to FIGS. 5 and 6. In general, the fluid A tends to penetrate between the mating ring D and the seal ring 8 then flow into the fluid B and thereafter leak to the outside. FIG. 6 illustrates a movement of the seal packing C to balance the pressure difference caused between the fluid A and the fluid B. Above the center line, the pressure of the fluid A is greater than the pressure of the fluid B, while below the center line the pressure of the fluid B is greater than the pressure of the fluid A. In either case, as shown in FIGS. 5 and 6, a floating failure of the seal ring is caused by clogging of solid substances or deposited crystals in the packing grooves and thus the leakage occurs through the sealing face.

On the other hand, in the construction as shown in both of FIGS. 3 and 4, the seal packings 2 and 3 are constantly pressed into contact with an adjoining groove wall and thus scarcely move. Accordingly, the seal packings provides preferable sealing properties, as no clogging and no floating failure occurs and a preferred sealing condition is attained for a long period.

It would be anticipated that a directional property occurs with respect to the pressure resistance of the seal packing 2 and the stability of the seal packing is damaged when the wall of the packing groove 4 on the fluid A side is removed, but such problems are avoided by a vacuum passage 6 provided between the seal packings.

In embodiments illustrated in FIGS. 2 and 4, the seal ring 8 is divided into two parts and a watertight packing 12 is provided between the two parts. Thus the two-part seal ring 8 can easily adjust to the vibration and eccentricity of the rotating shaft 1, thus enhancing the sealing properties of the sealing face 10.

Figure 7:
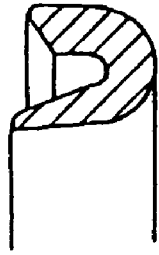
FIG. 7 shows cross sections of seal packings in accordance with the present invention.
Figure 7:
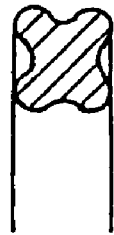
Figure 7:

Seal packings 3 and 4 may be formed in various sectional shapes as shown in the FIGS. 7 (A), (B) and (C) instead of O-rings.

The mechanical seal, in accordance with the present invention, is used as a contact seal mechanism which is essential to various kinds of hydraulic or air pressure machines such as pumps, compressors, stirring machines and so forth. And, good sealing properties are attained with the mechanical seals of the present invention regardless of the particular fluid types.

The mechanical seal of the present invention is preferably used for hydraulic or air pressure machines in which the pressure difference arises between sealed fluids which are opposed at the sealing face, or hydraulic machines in which crystals, contained in fluid, deposit or solid substances such as scales accumulate at the seal portion.

I claim:

1. A mechanical seal assembly in which balance factors can be established separately and freely for two fluids opposed at a sealing face of said mechanical seal assembly, said mechanical seal assembly comprising:

a casing having an inwardly extending radial flange;
   a rotatable shaft extending into said casing;

a seal ring supported by said casing and disposed about said shaft, said seal ring having a radial end face;
   a mating ring disposed about said shaft and having a radial end face, wherein said radial end face of said seal ring and said radial end face of said mating ring are disposed in an opposed sealing relation so as to define the sealing face;
   a first seal packing provided on an outer peripheral surface of said seal ring, wherein said first seal packing is supported in an axial direction only by said radial flange, and said radial flange is disposed on a side of said first seal packing which is opposite relative to a sealed fluid side of said first seal packing; and
   a second seal packing, axially spaced from said first seal packing, provided on the outer peripheral surface of said seal rings,
   wherein said first seal Packing and said second seal packing are disposed in different radial positions so as to define two separate balance factors.

2. The seal assembly as claimed in claim 1, further comprising a vacuum passage, communicating with a space between said first and second seal packings, for reducing a pressure between said first and second seal packings to atmospheric pressure or below.

3. The seal assembly as claimed in claim 2, wherein said vacuum passage is formed in said casing.

4. A mechanical seal assembly in which balance factors can be established separately and freely for two fluids opposed at a sealing face of said mechanical seal assembly, said mechanical seal assembly comprising:

a casing;
   a rotatable shaft extending into said casing and having an outwardly extending radial flange;
   a seal ring disposed about and supported by said rotatable shaft, said seal ring having a radial end face;
   a mating ring disposed about said shaft and supported on an inner peripheral surface of said casing, said mating ring having a radial end face, wherein said radial end face of said seal ring and said radial end face of said mating ring are disposed in an opposed sealing relation so as to define the sealing face;
   a first seal packing provided between an inner peripheral surface of said seal ring and an outer peripheral surface of said shaft, wherein said first seal packing is supported in an axial direction only by said radial flange which is disposed on a side of said first seal packing which is opposite relative to a sealed fluid side of said first seal packing; and
   a second seal packing, axially spaced from said first seal packing, disposed between the inner peripheral surface of said seal ring and the outer peripheral surface of said shaft
   wherein said first seal packing and said second seal packing are disposed in different radial positions so as to define two separate balance factors.

5. The seal assembly as claimed in claim 4, further comprising a vacuum passage, communicating with a space between said first and second seal packings, for reducing a pressure between said first and second seal packings to atmospheric pressure or below.

6. The seal assembly as claimed in claim 4, wherein said seal ring comprises a first part, a second part, and a third seal packing disposed between opposing radial faces of said first and second parts.

7. A mechanical seal assembly in which balance factors can be established separately and freely for two fluids opposed at a sealing face of said mechanical seal assembly, said mechanical seal assembly comprising:

- a casing;
- a rotatable shaft extending into said casing;
- a seal ring supported by said casing and disposed about said shaft, said seal ring having a radial end face;
- a mating ring disposed about said shaft and having a radial end face, wherein said seal ring is biased into contact with said mating ring so that said radial end face of said seal ring and said radial end face of said mating ring are disposed in an opposed sealing relation so as to define the sealing face;
- a first seal packing provided on an outer peripheral surface of said seal ring and engaged in a groove provided on an internal peripheral surface of said casing; and
- a second seal packing provided on the outer peripheral surface of said seal ring and axially spaced from said first seal packing,
- wherein said first seal packing and said second seal packing are disposed in different radial positions so as to define two separate balance factors.

8. A mechanical seal assembly in which balance factors can be established separately and freely for two fluids opposed at a sealing face of said mechanical seal assembly, said mechanical seal assembly comprising:

- a casing;
- a rotatable shaft extending into said casing;
- a seal ring disposed about and supported by said rotatable shaft, said seal ring having a radial end face;
- a mating ring disposed about said shaft and supported on an inner peripheral surface of said casing, said mating ring having a radial end face, wherein said seal ring is biased in the axial direction of the shaft so that said radial end face of said seal ring and said radial end face of said mating ring are disposed in an opposed sealing relation so as to define the sealing face;
- a first seal packing provided between an inner peripheral surface of said seal ring and an outer peripheral surface of said shaft, wherein said first seal packing is disposed in a first groove defined by said shaft and said seal ring; and
- a second seal packing disposed between the inner peripheral surface of said seal ring and the outer peripheral surface of shaft, said second seal packing being axially spaced from said first seal packing and disposed in a second groove defined by said shaft and said seal ring,
- wherein said first seal packing and said second seal packing are disposed in different radial positions so as to define two separate balance factors.

9. The seal assembly as claimed in claim 8, wherein said seal ring comprises a first part, a second part, and a third seal packing disposed between opposing radial faces of said first and second parts.

* * * * *